Patented Jan. 13, 1931

1,789,233

UNITED STATES PATENT OFFICE

KIDD W. HICKEY, OF RUSSELL, KANSAS

METHOD FOR TREATING CRUDE OIL

No Drawing.  Application filed January 11, 1929.  Serial No. 331,955.

The invention relates to the treatment of crude oil, and specifically to the separation of basic sediment from crude oil emulsion, or bad oil collecting at the bottom of tanks, reservoirs and other containers used for the storage of crude petroleum. The oil thus recovered is not affected since no heat is employed.

The compound includes

Sodium bicarbonate 6 lbs., borax 1 lb.

The quantity mentioned is added to eight gallons of water. The resultant solution is poured into a 250 barrel tank or other container of crude oil. Simultaneously with the pouring of the solution of sodium bicarbonate and borax 14 ounces of hydrochloric acid is added. The reaction is completed in about 10 hours.

The hydrochloric acid may be chemically pure or commercial. Other bicarbonates and acids may be used with similar results, but owing to the cost it is preferred to use sodium bicarbonate, borax and commercial hydrochloric acid. To give distinctive color green aniline dye is added about one gram to the quantity above stated.

The low cost and simplicity of the process surpasses anything heretofore used which is an important item to the producer. It enables the producer to realize more profit on a tank of oil at a much smaller expense. The process does not affect either the oil, the tanks, or pipe lines, and since no heat is necessary in its application the gravity of the oil is not changed. It enables the producer to recover 100% of the oil in the tank, since no so called "tank bottom" remains.

The purpose of using commercial hydrochloric acid and a solution of sodium bicarbonate, borax and water is to create a violent reaction when poured simultaneously into the tank of crude oil, which causes the basic sediment, foreign matter and water, to drop through to the bottom of the tank. This combination produces a more violent reaction than any combination not using a mineral acid. Green aniline dye is used in coloring the solution and the acid for the purpose of giving a distinctive color to the substances, and does not affect the action.

Having thus described my invention, it is obvious that various modifications may be made in the same without departing from the spirit of my invention. I do not wish to be understood as limiting myself to the specific combinations, proportions, processes or uses herein described.

Having thus described the invention, I claim:—

1. In a method of purifying crude mineral oil, the step which comprises adding an alkaline solution to the oil and separately and simultaneously adding an acid to produce a violent reaction and precipitation of the foreign matter and water.

2. In a method of purifying crude mineral oil, the step which comprises adding an alkaline solution to the oil and separately and simultaneously adding hydrochloric acid to produce a violent reaction and precipitation of the foreign matter and water.

3. In a method of purifying crude mineral oil, the step which comprises adding a solution of sodium bicarbonate and borax to the oil and separately and simultaneously adding an acid to produce a violent reaction and precipitation of the foreign matter and water.

4. In a method of purifying crude mineral oil, the step which comprises adding a solution of sodium bicarbonate and borax to the oil and separately and simultaneously adding hydrochloric acid to produce a violent reaction and precipitation of the foreign matter and water.

In testimony whereof I affix my signature.

KIDD W. HICKEY. [L. S.]